(No Model.)
J. A. LEWIS.
STEAM HEATER OR KETTLE FOR OLEAGINOUS SUBSTANCES.
No. 331,895. Patented Dec. 8, 1885.
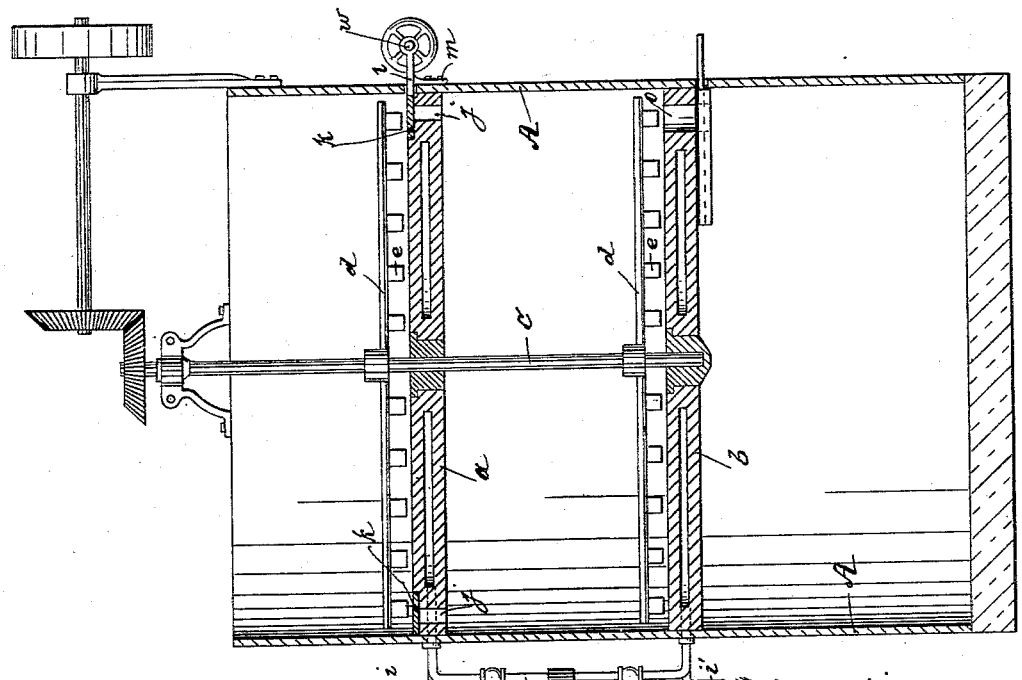
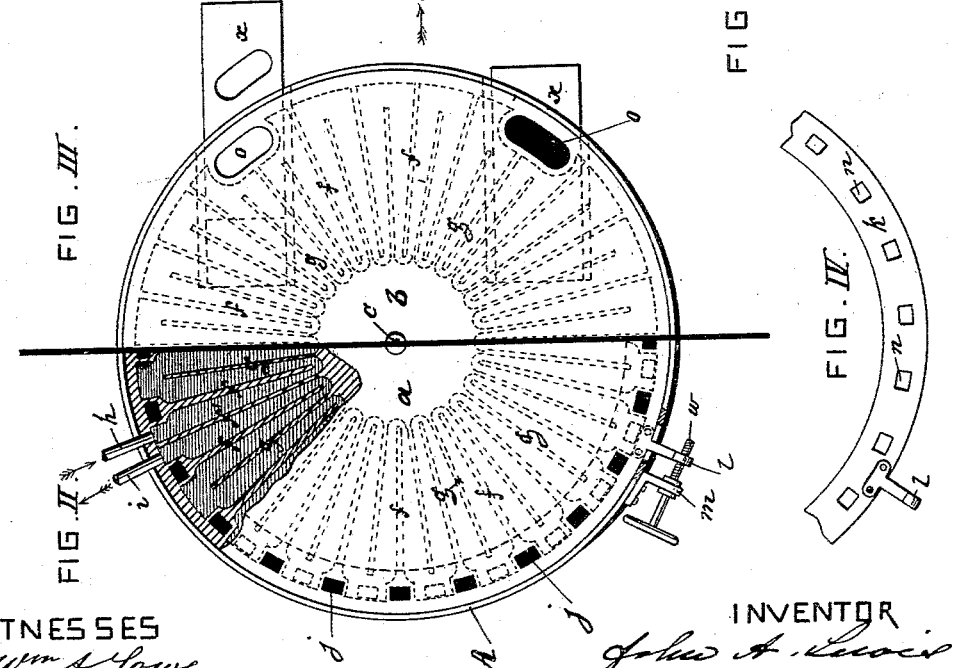
WITNESSES
Wm. A. Lowe
Rob. Roy
INVENTOR
John A. Lewis
per Rouder & Briesed
Attorneys.

UNITED STATES PATENT OFFICE.

JOHN A. LEWIS, OF MERIDIAN, MISSISSIPPI, ASSIGNOR TO THE UNITED STATES COTTON SEED CLEANING COMPANY, OF NEW YORK.

STEAM HEATER OR KETTLE FOR OLEAGINOUS SUBSTANCES.

SPECIFICATION forming part of Letters Patent No. 331,895, dated December 8, 1885.

Application filed July 15, 1885. Serial No. 171,724. (No model.)

*To all whom it may concern:*

Be it known that I, JOHN A. LEWIS, of Meridian, State of Mississippi, have invented a new and Improved Steam Heater or Kettle for Oleaginous Substances, of which the following specification is a full, clear, and exact description.

This invention relates to an apparatus for cooking cotton-seed and other oily seeds preparatory to pressing them.

The apparatus consists of a tank or vessel having two bottoms in which tortuous steam-passages are contained. The steam, in passing through these passages, heats the seed placed on the bottoms.

The apparatus also contains means for discharging the seed from the upper bottom to the lower bottom, and from the lower bottom out of the vessel.

The invention consists in the various features of improvement hereinafter more fully pointed out.

In the accompanying drawings, Figure I is a longitudinal central vertical section of my improved apparatus. Fig. II is a top view, partly in section, of one-half the upper bottom. Fig. III is a top view of one-half the lower bottom. Fig. IV is a detail view of section of the ring that operates to open and close the openings in the upper bottom.

The letter A represents a tank or vessel of cylindrical or other form and having two false bottoms, $a$ and $b$. The lower bottom, $b$, has a central bearing for the lower end of an upright shaft, $c$, that passes through the upper, $a$, and is connected to suitable mechanism for rotating it around its axis. The shaft $c$ is provided with radial arms $d$, to which a number of stirrers, $e$, are attached. These stirrers are located a short distance above the bottoms $a\,b$, and serve to stir the seeds placed thereon.

The bottoms $a\,b$ are hollow, Fig. I—that is to say, they are composed of an upper plate and a lower plate, which are united at the center and periphery, but disconnected between these points, so as to leave an annular internal chamber, Fig. I. This chamber is traversed by a number of radial partitions, $f\,g$, of which the partitions $f$ are secured at their outer ends to the rim, while they project with their inner ends to a point a short distance from the central core. The partitions $g$ are secured at their inner ends to such core, while they project with their outer ends to a short distance from the rim. The partitions $f\,g$ alternate with each other and form a continuous tortuous passage running from the rim to the center, and thence back to ther rim, as clearly shown in the drawings.

Steam enters through the pipe $h$ and passes into the tortuous passage through an opening in the rims of the bottoms $a\,b$. After the steam has traversed the entire length of such passages it is discharged through outlets $i\,i'$. The partition $f'$ in the bottoms $a\,b$, which is located between inlet and outlet, extends the whole distance between core and rim, as shown in Fig. II.

The bottom $a$ is provided with a number of openings, $j\,j$, around its circumference. These openings are arranged in a circle and extend entirely through the bottom. A ring, $k$, resting on bottom $a$ and provided with alternate open and closed portions, is placed above openings $j$. This ring may be slightly revolved, by mechanism hereinafter described, so as to cause its openings $n$ to register with the openings $j$, in which case the seed on bottom $a$ is free to fall upon the lower bottom, $b$. If the ring is in such a position that its openings $n$ are out of line with openings $j$, the seed is prevented from leaving bottom $a$.

The mechanism employed for revolving ring $j$ consists of a lug, $l$, attached to ring $k$, and of a lug, $m$, attached to bottom $a$ or vessel A. Both the lugs are perforated for the reception of a screw, $w$, which passes loosely through lug $m$ and engages a female screw-thread in lug $l$. On revolving screw $w$ to the right or left the ring is drawn backward or forward to any desired extent. In this way the openings $j$ may be either completely or partially opened, or they may be completely closed.

The lower bottom, $b$, has more or less large openings $o$ leading to suitable chutes that conduct the seed out of the apparatus.

The seed is droped on bottom $a$ and the shaft $c$ is revolved to operate the stirrers. Steam is admitted through inlet $h$, as described, and the seed is exposed to its action for the proper time, when it is dropped upon lower bottom, $b$, through openings $j$. After the seed has remained on bottom $b$ for a sufficient time it is discharged through the openings $o$, capable of being opened and closed by suitable slides, $x$.

I claim as my invention—

1. The combination of tank A with false bottom $a$, having openings $j$, and with ring $k$, having corresponding openings, $n$, substantially as specified.

2. The combination of tank A with false bottom $a$, having openings $j$, and with ring $k$, lugs $l\ m$, and set-screw $w$, substantially as specified.

3. The combination of tank A with false bottoms $a\ b$, having tortuous steam-passages and openings from top to bottom, and with stirrers $e$, steam-inlets $h$, steam-outlets $i\ i'$, and ring $k$, substantially as and for the purpose specified.

JNO. A. LEWIS.

Witnesses:
ROBT. ROY,
HENRY E. ROEDER.